Oct. 3, 1939.  C. E. CAMPAGNOLI  2,174,966
NECKTIE LINING
Filed April 16, 1938
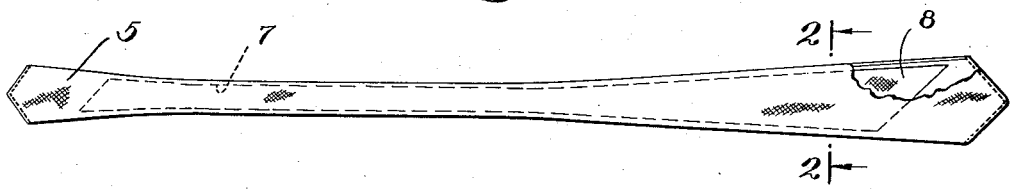
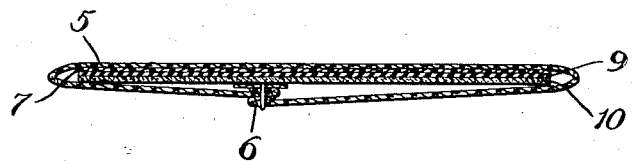
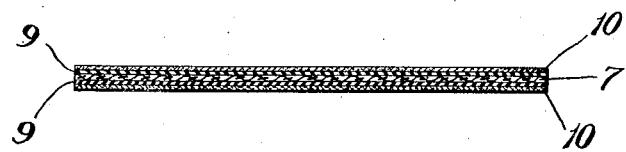
INVENTOR
CHARLES E. CAMPAGNOLI
BY
Howard E. Thompson
ATTORNEY Patented Oct. 3, 1939

2,174,966

UNITED STATES PATENT OFFICE 2,174,966

NECKTIE LINING

Charles E. Campagnoli, Palisade, N. J., assignor to G. J. M. Textile Corp., New York, N. Y., a corporation of New York Application April 16, 1938, Serial No. 202,427

1 Claim. (Cl. 2—146)

This invention relates to neckties and particularly to the lining thereof; and the object of the invention is to provide a lining of the class described which is composed of inexpensive material and is treated to give the material the form retaining properties of an expensive lining; a further object being to provide a lining impregnated on one or both sides thereof with a coating of a rubber base cement to give elasticity to the individual threads of the lining; a still further object being to provide a lining having one or both surfaces impregnated with a rubber cement and a coating of inert material on the cement to protect the cement coating and to render any odor thereof indetectable; and with these and other objects in view, the invention consists in a device of the class and for the purpose specified which is simple in construction, efficient in use, and which is constructed as more fully hereinafter described and claimed.

The invention is fully disclosed in the following specification, of which the accompanying drawing forms a part, in which the separate parts of my improvement are designated by suitable reference characters in each of the views, and in which:

Fig. 1 is a plan view of a tie showing my improved lining in position with a portion of the tie in section to show the bias of the lining.

Fig. 2 is a sectional view on the line 2—2 of Fig. 1, showing my improved lining treated on one side only; and, Fig. 3 is a sectional view of my improved lining treated on both sides.

In Figs. 1 and 2 of the drawing, I have shown a four-in-hand tie 5 formed from a sheet or sheets of fabric in the usual manner. The tie is stitched on the reverse side as seen at 6. A lining 7 composed of suitable inexpensive fabric cut on the bias in a conventional manner, as clearly shown at 8 in Fig. 1, is arranged within the tie 5.

The fabric of the lining is coated or impregnated, as shown at 9, with an elastic material, preferably a rubber base cement, which penetrates partly through the fabric enveloping individual strands thereof to give the strands elastic properties. A thin layer of this cement coating is applied to the lining and virtually becomes part of the fabric thereof. Immediately on top of the rubber coating, a layer of inert material is applied as at 10. The object of this layer is to form a protective coating for the cement and at the same time to form a shield rendering the rubber cement odorless. It also would prevent any portion of the rubber layer from becoming sticky and adhering to the outer jacket of the tie. In this inert layer I preferably employ finely pulverized corn or potatoe starch, but it should be understood that other inert materials, such for example, as pulverized talc, might be used. In this connection, it should be further understood that this inner layer might of itself be scented to further insure the impossibility of an objectionable odor of rubber prevailing.

In Fig. 3 I have shown an alternative construction of my improved lining in which the fabric 7 is treated on both sides with a rubber cement 9 and in which both outer surfaces of the lining have coatings of inert material 10.

It should be understood that my invention relates primarily to the construction of inexpensive ties; and a primary object of my invention is to enable the use of inexpensive material such as cotton in the lining thereof, and by treating said inexpensive material to obtain a fabric which will possess substantially the same non-wrinkling properties as the expensive woolen linings.

By impregnating one or both surfaces of the fabric with a rubber base cement, the strands of the fabric are partially coated with the elastic cement and the said strands become elastic in themselves. If the fabric is sharply creased, the elastic coating on the strands will be stretched and when the crease is straightened out, the elastic tends to return to its original form and in so doing straightens out the bent strands of the fabric.

It will be apparent that my improved lining will prevent a tie from wrinkling for it is the lining that gives a tie its shape-retaining properties. Most inexpensive ties have the objectionable feature of wrinkling very easily, but by using my improved lining in these ties, they will have the non-wrinkling properties now found only in expensive ties.

Having fully described my invention, what I claim as new and desire to secure by Letters Patent, is:

In neckties of the class described, a lining composed of inexpensive cotton fabric cut on the bias, means on at least one side of said lining giving the strands of said lining elastic properties, means on the same side of said lining forming a protective coating for said first named means, said first named means comprising a coating of rubber base cement impregnated into the fabric, and said second named means comprising a thin coating of inert material adapted to prevent any odor escaping from said rubber cement.

CHARLES E. CAMPAGNOLI.